United States Patent
Prevond et al.

(10) Patent No.: US 10,392,687 B2
(45) Date of Patent: *Aug. 27, 2019

(54) METHOD FOR MANUFACTURING A METAL ASSEMBLY HAVING A SHEET OF THERMALLY TREATED ALUMINUM TO OBTAIN ALPHA ALUMINA AND ANOTHER SHEET HAVING SURFACE IRREGULARITIES THAT BECOME EMBEDDED IN SAID SURFACE DURING ROLL BONDING

(75) Inventors: Laurent Prevond, Villeparisis (FR); Nicolas Collard, Rethel (FR); Renaud Caplain, Paris (FR); Pierre Francois, Montrouge (FR)

(73) Assignees: Centre National de la Recherche Scientifique (CNRS) (FR); CNAM-Conservatoire National Des Arts Et Metiers (FR); Ecole Normale Superieure De Cachan (FR)

( * ) Notice: Subject to any disclaimer, the term of this patent is extended or adjusted under 35 U.S.C. 154(b) by 805 days.

This patent is subject to a terminal disclaimer.

(21) Appl. No.: 13/634,017

(22) PCT Filed: Mar. 11, 2011

(86) PCT No.: PCT/EP2011/053747
§ 371 (c)(1),
(2), (4) Date: Nov. 16, 2012

(87) PCT Pub. No.: WO2011/110685
PCT Pub. Date: Sep. 15, 2011

(65) Prior Publication Data
US 2013/0048154 A1 Feb. 28, 2013

(30) Foreign Application Priority Data
Mar. 12, 2010 (FR) ..................... 10 51808

(51) Int. Cl.
*B22F 3/18* (2006.01)
*B22F 7/00* (2006.01)
(Continued)

(52) U.S. Cl.
CPC ............... *C23C 8/80* (2013.01); *B21D 47/04* (2013.01); *B22F 7/04* (2013.01); *B23K 31/02* (2013.01);
(Continued)

(58) Field of Classification Search
CPC .................................................. B21B 27/005
(Continued)

(56) References Cited

U.S. PATENT DOCUMENTS 3,425,113 A * 2/1969 Ward, Jr. ............... B21D 53/04
165/170
3,470,607 A * 10/1969 Winter .................. B23K 20/04
228/117
(Continued)

FOREIGN PATENT DOCUMENTS

EP 1468765 A1 10/2004
GB 2144061 A * 2/1985 ............. B23P 17/04
(Continued)

OTHER PUBLICATIONS

D. Pilone, F. Felli, U. Bernabai. "FeCrAl alloys produced by roll-bonding and annealing of Al(RE)-clad stainless steel: how addition of Hf and Zr affects their oxidation behavior." Materials Science Forum vols. 604-605 (2009) pp. 133-137.*
(Continued)

*Primary Examiner* — Paul A Wartalowicz
*Assistant Examiner* — Stephani Hill
(74) *Attorney, Agent, or Firm* — Lerner, David, Littenberg, Krumholz & Mentlik, LLP

(57) ABSTRACT

A method for manufacturing a metal assembly including an aluminum sheet and at least one metal sheet. An aluminum
(Continued)

sheet is treated by heating to a temperature of between 80% and 100% of the melting temperature of the material of which it is comprised for a sufficiently long duration to create and stabilize an alpha alumina layer at the surface of the aluminum sheet. The sheet is then cooled. A metal sheet having a ductility less than or equal to the ductility of the aluminum sheet after cooling is provided, which has surface irregularities having a depth greater than or equal to the thickness of the alpha alumina layer. The aluminum sheet and the metal sheet are roll bonded in a rolling mill to produce the metal assembly, wherein the rolling mill includes at least one cylinder, the outer rolling surface of which is provided with raised portions.

27 Claims, 2 Drawing Sheets

(51) Int. Cl.

| | | |
|---|---|---|
| B22F 7/04 | (2006.01) | |
| B32B 3/28 | (2006.01) | |
| B32B 3/26 | (2006.01) | |
| B32B 5/18 | (2006.01) | |
| C22F 1/00 | (2006.01) | |
| C22F 1/04 | (2006.01) | |
| C23C 8/80 | (2006.01) | |
| B32B 15/01 | (2006.01) | |
| B32B 15/04 | (2006.01) | |
| B32B 15/20 | (2006.01) | |
| B21D 47/04 | (2006.01) | |
| B23K 31/02 | (2006.01) | |
| F28F 21/08 | (2006.01) | |
| C22C 47/20 | (2006.01) | |

(52) U.S. Cl.
CPC ............... *B32B 3/266* (2013.01); *B32B 3/28* (2013.01); *B32B 5/18* (2013.01); *B32B 15/012* (2013.01); *B32B 15/016* (2013.01); *B32B 15/017* (2013.01); *B32B 15/04* (2013.01); *B32B 15/20* (2013.01); *C22F 1/00* (2013.01); *C22F 1/04* (2013.01); *F28F 21/084* (2013.01); *B22F 7/004* (2013.01); *B22F 2999/00* (2013.01); *B32B 2457/18* (2013.01); *C22C 47/20* (2013.01); *F28F 2275/06* (2013.01); *Y10T 428/12479* (2015.01)

(58) Field of Classification Search
USPC ...................................... 29/890.129; 148/594
See application file for complete search history.

(56) References Cited

U.S. PATENT DOCUMENTS

| | | | | |
|---|---|---|---|---|
| 3,781,971 | A * | 1/1974 | Middleton | B21D 53/04 228/116 |
| 3,884,731 | A * | 5/1975 | Barkman | B32B 15/012 148/531 |
| 4,620,590 | A * | 11/1986 | Koisuka | F28D 1/0477 165/150 |
| 4,711,009 | A * | 12/1987 | Cornelison et al. | 29/890 |
| 6,096,145 | A | 8/2000 | Pandey et al. | |
| 2004/0045643 | A1* | 3/2004 | Hewett | B23K 20/04 148/535 |
| 2006/0123867 | A1* | 6/2006 | Ball | B21B 1/227 72/197 |
| 2008/0099183 | A1* | 5/2008 | Milnthorp | B32B 15/012 165/77 |
| 2008/0241582 | A1 | 10/2008 | Groll | |
| 2009/0130481 | A1* | 5/2009 | Takada | B22D 11/007 428/650 |
| 2009/0166067 | A1* | 7/2009 | Iwai | B32B 15/016 174/257 |

FOREIGN PATENT DOCUMENTS

| | | |
|---|---|---|
| GB | 2326117 A | 12/1998 |
| JP | 10263801 A | 10/1998 |

OTHER PUBLICATIONS

G. A. Capuano, A. Dang, U. Bernabai, F. Felli. High-temperature oxidation and thermal cycling of aluminum-electroplated stainless steels. Oxidation of Metals vol. 39 Nos. 3/4 (1993) pp. 263-279.*
Specifying mechanically polished, brushed and buffed stainless steel finishes and their applications. Online. British Stainless Steel Association. Oct. 19, 2007.*
M. A. Kuttolamadom, S. Hamzehlouia, M. L. Mears. "Effect of machining feed on surface roughness in cutting 6061 aluminum." SAE Int. J. Mater. Manuf. 3(1): 108-119, 2010.*
M. H. Jacobs. "TALAT Lecture 1201 Introduction to Aluminum as an Engineering Material." European Aluminum Association. Issues 1999. 22 pages.*
"Melting temperatures of some common metals and alloys." The Engineering ToolBox. http://www.engineeringtoolbox.com/melting-temperature-metals-d_860.html. Accessed Nov. 5, 2015.*
L. Li, K. Nagai, F. Yin. "Progress in cold roll bonding of metals." Sci. Technol. Adv. Mater. 9 (2008) 11 pages.*
"Aluminum Alloys—Effects of Alloying Elements." Total Materia. http://www.totalmateria.com/Article55.htm Published Sep. 2002. Accessed Dec. 12, 2016.*
Abbasi et al. "Effects of processing parameters on the bond strength of Cu/Cu roll-bonded strips." Journal of Materials Processing Technology 210 (2010) 560-563. (Year: 2010).*
International Search Report for Application No. PCT/EP2011/053747 dated May 16, 2011.
French Preliminary Search Report for Application No. FR1051808 dated Oct. 14, 2010.

* cited by examiner

METHOD FOR MANUFACTURING A METAL ASSEMBLY HAVING A SHEET OF THERMALLY TREATED ALUMINUM TO OBTAIN ALPHA ALUMINA AND ANOTHER SHEET HAVING SURFACE IRREGULARITIES THAT BECOME EMBEDDED IN SAID SURFACE DURING ROLL BONDING

CROSS REFERENCE TO RELATED APPLICATIONS

The present application is a national phase entry under 35 U.S.C. § 371 of International Application No. PCT/EP2011/053747 filed on Mar. 11, 2011, which claims priority from French Patent Application No. 1051808, filed Mar. 12, 2010, the disclosures of which are incorporated by reference herein.

The invention concerns in general terms the manufacture of aluminium/metal assemblies.

More precisely, the invention concerns the manufacture of an assembly comprising an aluminium sheet and a metal sheet connected together and formed so as to obtain a metal assembly having good cohesion.

Aluminium is a malleable paramagnetic metal of low density, highly conductive and having remarkable oxidation resistance properties.

When it is oxidised with air, it very quickly forms on the surface a fine layer of alumina that protects it against the progression of oxidation. This natural alumina layer has a thickness generally ranging from one to three micrometer.

Nevertheless, alumina is very insulating, unlike aluminium, and forms a barrier in particular preventing wetting of aluminium on another metal (for example on iron, steel or copper).

Some applications do however require materials having not only the properties of aluminium, in particular its conductivity, its low density, etc. but also additional properties such as magnetism, rupture strength, ability to be welded and rigidity, which in particular steel or nickel may exhibit.

However, the manufacture of an assembly comprising aluminium and iron is very problematic since these materials are difficult to combine.

Typically, equilibrium diagrams show that aluminium alloys with ferromagnetic materials are possible, but these alloys are only able to form predetermined compounds that are mechanically fragile and paramagnetic.

The manufacture and forming of metal assemblies comprising a sheet (or plate) of aluminium and a sheet (or plate) produced from another metal, in particular nickel, copper, cobalt or even aluminium, is also of interest to manufacturers. This is because producing lightweight rigid metal assemblies currently requires assembly by welding, bonding, etc. that cannot easily be achieved with all types of metal, in particular with aluminium.

For example, in the case of heat exchangers, it is sought to obtain rigid metal assemblies resistant to corrosion and of low density at less cost. However, the use of commercially available aluminium plates is not suitable given their malleability, and their assembly with other metals (in the form of a plate, powder, etc.) is made difficult through the presence on the surface of the layer of alumina.

Numerous methods of manufacturing metal assemblies based on aluminium have been developed, but all have the drawback of being lengthy and difficult to implement, requiring for most of the time specific installations, and have a high energy cost.

One objective of the invention is therefore to propose a method of manufacturing a reproducible low-cost metal assembly involving low energy expenditure and making it possible to obtain a metal assembly that is lightweight while having great rigidity and where applicable good corrosion resistance.

For this purpose, the invention proposes a method of manufacturing a metal assembly comprising a first sheet based on aluminium and at least one second metal sheet, comprising the steps consisting of:
heat treating the aluminium sheet by raising it to a temperature between 80% and 100% of the melting point of the material constituting it in order to create and stabilise an alpha alumina layer by allotropic transformation of the oxide layer present on the surface of said aluminium sheet, and then allowing it to cool again;
providing a metal sheet having a ductility less than or equal to the ductility of the aluminium sheet after cooling, said sheet having surface irregularities with a depth greater than or equal to the thickness of the layer of alpha alumina; and
roll bonding the aluminium sheet and the metal sheet (20) in a rolling mill in order to obtain the metal assembly, wherein the rolling mill comprises at least one cylinder, the external rolling surface of which is provided with reliefs.

Certain preferred but non-limitative aspects of the manufacturing method according to the invention are as follows:
the roll bonding is carried out cold,
the roll bonding is carried out in a single pass,
the duration of the heat treatment of the aluminium sheet is between around twenty minutes and approximately two hours;
the reliefs are furrows or crosses,
the furrows are rectilinear, toothed, crenellated and/or sinuous,
the reliefs extend in a general direction parallel and/or transverse to the direction of rolling of the sheets in the rolling mill,
the external rolling surface of the two complementary cylinders of the rolling mill have identical reliefs in phase opposition during the roll bonding,
only the surface of one of the cylinders is provided with reliefs, the facing cylinder being smooth,
the metal sheet is formed by one of the elements in the following group: a metal grille, a metal lattice, a metal foam, a metal honeycomb structure, metal cables, or a rough metal sheet,
the metal sheet is produced from one of the materials in the following group: steel, iron, nickel, cobalt, copper, metal with a cubic crystallographic structure with centred faces, or alloys thereof,
it also comprises the following steps prior to the step of roll bonding of the sheets:
heating the metal sheet to a temperature of between approximately 70% and 98% of the melting point of the metal constituting it for a period determined according to the thickness of the sheet; and
allowing the sheet to cool to ambient temperature,
it also comprises a step during which the metal sheet is stripped between the cooling and roll bonding steps,
the metal sheet is a supplementary aluminium sheet, said method also comprising, prior to the step of roll bonding of the sheets, the following steps:

raising the supplementary aluminium sheet to a temperature of between 80% and 100% of the melting point of the material constituting it for a sufficient period to create and stabilise a layer of alpha alumina on the surface of said aluminium sheet; and allowing the supplementary aluminium sheet to cool, it also comprises a step during which the metal sheet receives a surface treatment, it also comprises a step of assembling the aluminium and metal sheets prior to roll bonding thereof, the step of assembling the sheets is carried out by riveting, spot welding, pre-rolling of a head of the sheets, self-perforating screws, electron beam welding, adhesive bonding and/or flanging, a supplementary metal sheet is also roll bonded with the aluminium and metal sheets, the two metal sheets and the aluminium sheet are roll bonded simultaneously in a single step, the aluminium sheet and the metal sheet are first of all roll bonded in a rolling mill with smooth cylinders in order to obtain a flat assembly, said flat assembly then being roll bonded with the supplementary metal sheet in the rolling mill with a cylinder or cylinders with reliefs in order to obtain the metal assembly, it also comprises a step of applying a layer of powder to the aluminium sheet prior to the roll bonding step, the aluminium sheet and the powder are roll bonded in a rolling mill with smooth cylinders in order to obtain a flat assembly, said flat assembly then being roll bonded with the metal sheet in the rolling mill comprising at least one cylinder, the external rolling surface of which is provided with reliefs in order to obtain the metal assembly, the powder is applied between the aluminium sheet and the metal sheet prior to the roll bonding step, the assembly comprising the aluminium sheet, the powder and the metal sheet then being roll bonded in the rolling mill, and it also comprises a supplementary step of dehydration of the metal powder prior to application thereof to the aluminium sheet.

According to a second aspect, the invention proposes a method of manufacturing a heat exchanger, comprising a step of forming an aluminium sheet with at least one metal sheet according to a method according to the invention in a rolling mill comprising a first cylinder, the external rolling surface of which has furrows extending longitudinally to the rolling direction, and a second cylinder the external rolling surface of which is smooth or has furrows in phase opposition with the furrows on the first cylinder.

Some preferred but non-limitative aspects of the method of manufacturing a heat exchanger are as follows:

the metal sheet is a sheet of copper, iron or steel, and the metal sheet is a supplementary aluminium sheet, and the method also comprises, prior to the step of roll bonding of the sheets, the following steps:

raising the supplementary aluminium sheet to a temperature of between 80% and 100% of the melting point of the material constituting it for a sufficient period to create and stabilise a layer of alpha alumina on the surface of said aluminium sheet; and allowing the supplementary aluminium sheet to cool.

Other features, aims and advantages of the present invention will emerge more clearly from a reading of the following detailed description with regard to the accompanying drawings, given by way of non-limitative example and in which.

Figure 3:
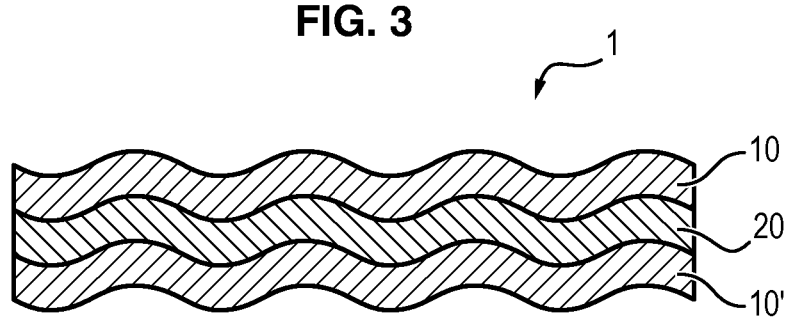
Figure 4:
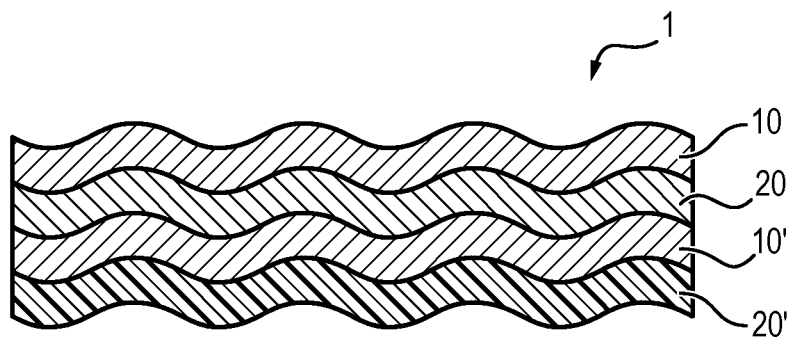
Figure 5:
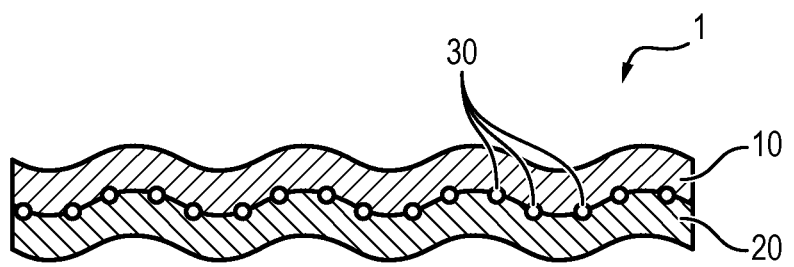
Figure 6:
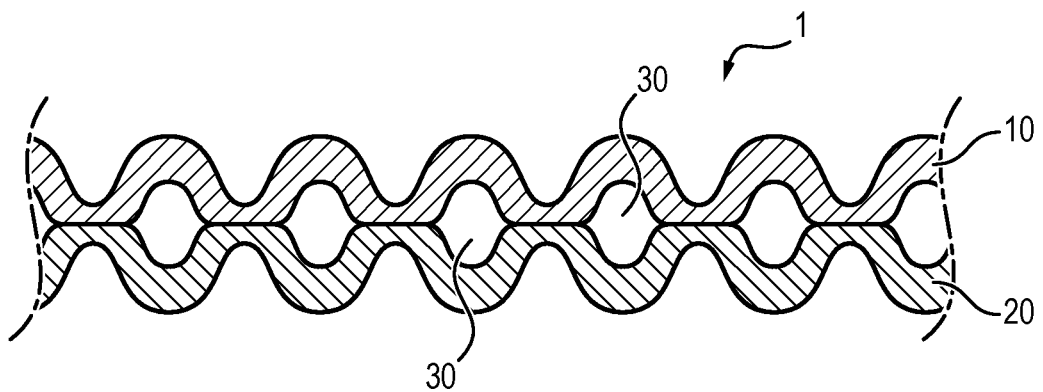

FIG. 3 is a view in transverse section of a second example of a metal assembly that can be fabricated according to a method in accordance with the invention, FIG. 4 is a view in transverse section of a third example of a metal assembly that can be fabricated according to a method in accordance with the invention, FIG. 5 is a view in transverse section of a fourth example of a metal assembly that can be fabricated according to a method in accordance with the invention, and FIG. 6 is a view in transverse section of a fifth example of a metal assembly that can be fabricated according to a method in accordance with the invention.

We shall first of all describe a general method of fabricating a metal assembly according to the invention, comprising at least one aluminium sheet 10 and one metal sheet 20 shaped and forming a coherent stack.

This method comprises a step of heat treatment of the aluminium sheet followed by a roll bonding step in a rolling mill comprising cylinders, the external surface of at least one of the cylinders being not smooth but provided with reliefs.

According to a first step, an allotropic transformation of the layer of oxide present on the surface of the aluminium sheet 10 is carried out.

For this purpose, the aluminium sheet 10 is raised to a temperature of between approximately 80% and 100% of the melting point of its constituent material for a sufficiently long period to stabilise and homogenise said layer. This step is preferably performed in a dry environment.

Preferably, the aluminium sheet 10 is heated to a temperature of between 93% and 98% of the melting point, more preferentially still to a temperature of around 95% (+/−1%).

Sheet means here a thin plate (a few millimeters thick), a foil (a few microns thick), etc., or any substantially flat form that can be rolled.

The aluminium sheet 10 may moreover be produced from pure aluminium or an aluminium alloy.

Nevertheless, the invention is particularly suited to aluminium sheets that have good thermal conduction and can be raised to a uniform temperature throughout their volume. Typically, it may be an aluminium sheet produced from the series 1000 in the international classification system (A5 to A9, etc.).

For example, the aluminium sheet may be a food-quality aluminium paper with a thickness of between 5 and 20 microns heated between 500° C. and 660° C.

For these two examples of aluminium sheet 10, the duration of the heat treatment is then between around twenty minutes and approximately two hours, preferably around thirty minutes.

In the case of aluminium foils 10 with greater thickness, typically 12 mm, the duration of the heat treatment is then preferably around 45 minutes.

As stated above, the thickness of the aluminium sheet 10 is limited by the rolling conditions to a few millimeters. However, in all cases, the duration of the heat treatment preferably does not exceed two hours.

The durations indicated above are of course orders of magnitude, and may be extended according to the conditions of performance of the heat treatment, more particularly according to the type and initial quality of the aluminium used, the characteristics of the oven and the ambient residual humidity. The layer of alpha alumina may degrade if the treatment duration is too prolonged under poor conditions.

The heat treatment is preferably carried out in a dry environment, for example by preheating the oven so as to eliminate the residual moisture and thus prevent hydroxydation of the alpha alumina layer. It is then possible to increase the duration of the heat treatment up to for example four hours without damaging the aluminium sheet 10.

The use of an oven using the atmosphere external to the oven for ventilation also risks giving an alpha alumina layer that is hydroxydised, and therefore of less good quality. Preferably, a controlled-atmosphere oven is therefore used if it is wished to increase the duration of the heat treatment.

The quality of the alpha alumina layer may also depend on the type of aluminium in the sheet 10 and the quality of the oven: the purer the aluminium (such as A9 aluminium) and the less contaminated the oven, the more the heat treatment of aluminium sheet can be prolonged without risking damaging the alpha alumina layer.

For example, the heat treatment of an aluminium sheet consisting of an A5 alloy in a "contaminated" oven for four hours gives a layer of alpha alumina which, although it is stabilised, is of poor quality and exhibits green and black marks due to the interaction of the various materials constituting the A5 alloy with the metals of the oven.

In a second step, the aluminium sheet 10 is cooled.

It is necessary in fact to distinguish the time necessary for cooling the aluminium sheet 10 and the residence time at the stabilisation temperature of the aluminium layer, which must be considered to be essential. The cooling time and the final temperature after cooling are not in fact decisive characteristics per se, as long as the temperature of the aluminium sheet 10 is reduced sufficiently to allow "cold rolling" thereof (see further in the description).

It is in fact possible to leave the sheet 10 to cool slowly in the air or quickly (for example by quenching), without this having any influence on the result obtained.

The final cooling temperature may for example be the temperature of the room in which the method is implemented, typically around 20°. It is however possible to cool the aluminium sheet 10 further (for example to zero degrees Celsius), or to cool it less (for example to around sixty degrees Celsius).

An aluminium sheet 10 is then obtained having a lower rupture strength than the aluminium sheet before heat treatment (between 15 and 20 MPa, instead of around sixty before heat treatment). The heat treatment in fact increases the grain size of the aluminium, thus facilitating subsequent working thereof.

In a last step, the aluminium sheet 10 is roll bonded with the chosen metal sheet 20 in the rolling mill.

It is not necessary to implement the roll bonding immediately after the heat treatment. For example, it is possible to allow a few hours or even a few weeks to elapse between the heat treatment and the roll bonding of the sheets.

The metal sheet 20 for its part must have certain physical properties in order to guarantee coherent assembly thereof with the aluminium sheet 10 according to the method of the invention.

In particular, at least one of the faces of the metal sheet 20 must have surface irregularities with a depth greater than or equal to the thickness of the alpha alumina layer created during the heat treatment of the aluminium sheet 10, i.e. typically around 5 microns.

It is important to note that the thickness of the alumina layer remains roughly constant, equal to 5 microns (to within 1-2 microns), whatever the thickness of the aluminium sheet 10, even if the heat treatment is continued beyond the duration necessary to stabilise it. Nevertheless, beyond a few hours (generally four hours), the heat treatment becomes a "homogenisation" treatment: the alpha alumina layer degrades and the grains constituting it are no longer in the same plane, so that its final thickness is modified and it exhibits black and green effects.

For example, the metal sheet 20 may be a lattice (or in more general terms a grille), or a honeycomb structure, the surface irregularities then being formed by the through or obstructed holes present in the metal sheet 20. Lattice means here a lattice produced in a single piece by cropping and drawing rolled metal, while grille means for example a sheet produced by weaving wires.

It may also be a metal foam the pores of which are preferably open and have a diameter greater than or equal to 5 microns, or a metal sheet the surface roughnesses of which have a size greater than or equal to 5 microns.

Other types of metal sheet are of course usable, as long as the surface irregularities are of a sufficiently great size. For example, it is possible to treat a metal sheet 20 with a smooth surface so as to make it sufficiently irregular to be able to be used in the invention, by brushing with steel wool, by sanding, by chemical treatment, etc.

The metal sheet can also receive a surface treatment by wet or dry method in particular to increase the corrosion resistance of the metal sheet 20 as well as some of its physical characteristics, such as its electrical conductivity, or its magnetic permeability, and to modify its coefficient of friction.

For example, it is possible to effect a deposition of nickel on a metal sheet 20 in order to increase the corrosion resistance thereof.

The metal sheet 20 must also be less ductile than the aluminium sheet 10 after heat treatment so as to allow inter-penetration of the aluminium in the surface irregularities of the metal sheet 20 during the roll bonding step. It may for example be implemented in steel, iron, nickel, cobalt, copper, a metal with a cubic crystallographic structure with centred faces (gold, copper, silver, etc.) or alloys thereof.

It should be noted that an aluminium sheet that is identical or similar to the first aluminium sheet and that has undergone heat treatment does indeed meet the requirements for being used as a metal sheet in the manufacturing method. This is because the heat treatment firstly creates and stabilises on the surface a layer of alpha alumina that has a roughness approximately 5 microns thick (and therefore a sufficiently irregular surface) and secondly makes the sheet substantially as ductile as the first aluminium sheet.

The roll bonding of the aluminium sheet 10 with the metal sheet 20 can therefore be carried out hot or cold, in one or more passes. However, the inventors noted in this regard that roll bonding cold (i.e. at ambient temperature, without a new heating of the sheets, for example between approximately 0° C. and 60° C., in a single pass made it possible to obtain much better results).

This is because, by making several passes, the metal assembly 1 formed by the aluminium sheet 10 and the metal sheet 20 risks delaminating, while, by making only one pass, the aluminium sheet 10 interpenetrates the metal sheet 20 so as to form a coherent metal assembly 1.

The roll bonding can in particular be carried out at a speed of between 0.1 km/h and 3 km/h, with for example a rolling reduction rate of between approximately 2 and 10. Prior to the roll bonding, it is possible to assemble the aluminium sheet 10 and the metal sheet 20 in order to prevent the metal assembly 1 from deforming or drifting during roll bonding, for example by riveting the sheets 10 and 20, spot welding, pre-rolling of the metal assembly 1, self-perforating screws, electron beam welding, or any conventional bonding or flanging system.

Contrary to the prejudices existing in the metallurgy field, spot welding of the sheets becomes in fact possible by virtue of the heat treatment undergone by the aluminium sheet 10, and more particularly because of the allotropic transformation and the stabilisation of the layer of oxide.

Moreover, as seen previously, the external surface of at least one cylinder of the rolling mill comprises reliefs.

For example, the reliefs are in the form of furrows, extending parallel or transversely to the rolling direction, crosses, etc. The furrows may be rectilinear (crenellated cylinders) or on the contrary non-rectilinear (in particular toothed, crenellated or sinuous furrows or a combination of these patterns), uniform (U-shaped walls of constant width) or non-uniform (U-shaped walls with a width variable along the surface of the cylinder), etc.

Figure 1:
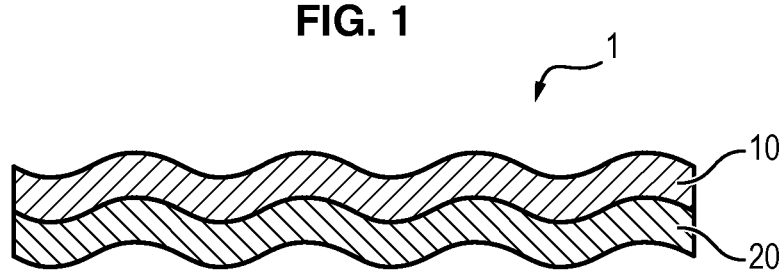
FIG. 1 is a view in transverse section of a first example of a metal assembly that can be manufactured according to a method in accordance with the invention.
Figure 2:
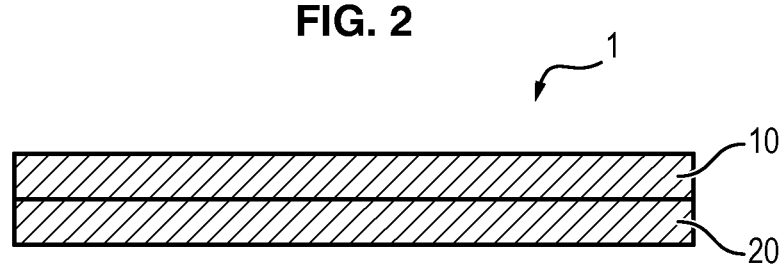
FIG. 2 is a view in longitudinal section of the example of metal assembly of FIG. 1.

When two adjacent cylinders of the rolling mill are provided with reliefs, these may be identical and in phase, so that the projecting parts of the reliefs are facing each other during rolling of the assembly. Typically, for reliefs in the form of rectilinear furrows extending parallel to the rolling direction, a metal assembly is then obtained in which the aluminium sheet and the metal sheet are assembled and form between them furrows extending in the rolling direction (see in particular the accompanying FIGS. 1 and 2).

In a variant, the reliefs can also be identical and in phase opposition. For reliefs in the form of rectilinear furrows extending parallel to the rolling direction, a metal assembly is then obtained comprising tubes 30 welded together, as illustrated in the accompanying FIG. 6. Such an assembly can then in particular be used in the manufacture of a heat exchanger.

In general terms, these metal assemblies have great rigidity in the rolling direction, low density and increased corrosion resistance (through the use of aluminium).

More generally, the choice of reliefs is guided by the application of the metal assembly. This is because the use of reliefs and materials for the metal sheet 20 extending in a given general direction stiffens the metal assembly in this direction. For example, when the cylinders are crenellated, the reliefs then being rectilinear furrows parallel to the rolling direction, roll bonding confers great rigidity on the final metal assembly in this direction. Moreover, the use of reliefs having two extension directions, such as toothed, sinusoidal or crenellated furrows, or crosses, makes it possible to obtain metal assemblies stiffened in the directions both parallel and transverse to the rolling direction.

The final thickness of the metal assembly depends on the initial thicknesses of the aluminium and metal sheets, the reliefs on the cylinders and the forces applied in the rolling mill.

The alpha alumina layer also fulfils a role of lubricant during the roll bonding of the metal assembly 1 and substantially increases the corrosion resistance of the aluminium.

A metal assembly 1 is then obtained having remarkable properties such as increased resistance to corrosion and to tensile forces, a high mechanical strength to weight ratio, a more extensive use temperature range than that of pure aluminium (between approximately −200° C. and +200° C. for an aluminium/iron assembly), or conductivity similar to the conductivity of aluminium before heat treatment. The metal assembly 1 may also receive surface treatments, be stamped or shaped, welded, etc. just like any other conventional metal sheet.

Finally, the metal assembly may comprise several different or identical metal sheets. These sheets are then preferably roll bonded directly together, in a single pass and cold.

In a variant, the metal assembly may be reinforced by the addition of a layer of metal powder that is spread between two sheets before roll bonding, for example between two aluminium sheets. It should be noted that such a metal sheet 20 meets the conditions posed with regard to the surface irregularities if its granulometry is greater than or equal to the thickness of the alumina layer of the aluminium sheet 10.

The metal powder may be a powder made of steel, iron, nickel, cobalt, copper, a metal with a cubic crystallographic structure with centred faces (gold, copper, silver, etc.) or alloys thereof.

We will now describe manufacturing methods according to the invention in more detail, taking examples of metal sheets and reliefs that can be used. The following examples are however in no way limitative and are given only by way of illustration.

It should moreover be noted that, whatever the example of the method described hereinafter, the heating, cooling and roll bonding steps remain the same as in the context of the general manufacturing method described above.

For a metal assembly 1 comprising an aluminium sheet 10 and a metal sheet 20, the method may also comprise a supplementary step of heating the steel sheet to a temperature of between 70% and 98% of its melting point, for example 1100° C., for a period depending on the thickness of the sheet, typically for 30 minutes for a metal sheet 20 one millimeter thick.

The heating time depends on the density, the thermal capacity, the thermal conductivity and the thickness of the metal sheet 20.

In this example embodiment, the aluminium sheet 10 is produced from a series 1000 alloy and the metal sheet 20 is a lightly alloyed XC10 steel sheet.

The steel is then cooled to the cooling temperature of the aluminium sheet. Once again, as for the aluminium sheet 10, the duration of the cooling and the final temperature of the cooled steel are not decisive parameters.

The metal sheet 20 is then stripped mechanically or chemically so as to remove the layer of oxides present on the surface that could prevent the formation of a coherent metal assembly 1.

According to one embodiment, the stripping is carried out by sandblasting. Given that the surface of the metal sheet 20 must not be regular, the granulometry of the sandblasting is not important. On the other hand, the pressure of the sandblasting must be controlled in order to prevent intrusions of abrasive grains in the metal.

In a variant, the stripping is carried out by acid attack (for example with hydrochloric acid), by brushing with steel wool, or any other known technique.

The steel sheet 20 thus obtained is then roll bonded with the thermally treated aluminium sheet 10, preferably cold and in a single pass, in a rolling mill at least one of the cylinders of which has an external surface provided with reliefs.

The metal assembly 1 thus obtained then has unexpected properties.

Firstly, the metal assembly 1 combines some of the properties particular to aluminium and steel taken separately. Thus, it was found that the metal assembly was ferromagnetic and was capable of attracting magnets and maintaining them in contact with its external surface, while having good electrical conductivity and low density.

For example, for a metal assembly 1 comprising a food-quality aluminium paper of grade A5 and a nickel lattice approximately 1 mm thick, the relative magnetic permeability of the assembly is around 300, its conductivity is close to that of aluminium (around $4.6 \times 10^{+8}$ ohms$^{-1}$.m$^{-1}$), its mechanical tensile strength is around 10 MPa (which is important for a sheet 10 of such low thickness, approximately 100 microns), whilst its density is around 4.7.

In this way it becomes possible to use the aluminium/nickel metal assembly 1 obtained according to the method of the invention in order to produce flexible electromagnetic shielding, lightweight and mechanically strong, according to the thicknesses chosen for the aluminium 10 and metal 20 sheets.

In addition, the assembly 1 may undergo successive roll bonding making it possible to mechanically increase the number of layers from a single initial assembly. This multilayer then has characteristics even superior to the initial assembly in particular in terms of mechanical strength (traction/tearing) and magnetic resistance through better distribution through the thickness.

Preferably, in the case of successive rolling, the first roll bonding operations are carried out in a rolling mill with smooth cylinders, and only the last roll bonding is carried out with one or more cylinders the surface of which has reliefs.

Moreover, in the example embodiment where the metal sheet 20 is made from steel, it is possible to use only a rolling mill with two cylinders instead of a compression rolling mill with four (or more) cylinders, since the assembly 1 remains sufficiently aligned during rolling.

Moreover, tests carried out on such a metal assembly 1 showed that it resisted corrosion and delamination in a saturating steam phase environment at 210° C. for 12 hours. Likewise, the assemblies obtained resisted temperatures of 77K (approximately −196° C.) without delaminating.

Tests also showed that the aluminium sheets obtained following the heat treatment implemented in the first step of the method according to the invention had a wider range of use temperatures (between approximately −200° C. and +200° C., instead of −200° C. and +150° C. for the sheets alone.

It should be noted however that the heat treatment of the metal sheet 20 is not necessary for all materials. Its purpose is to mechanically soften the material constituting it.

For example, in the context of the manufacture of a metal assembly 1 formed by an aluminium sheet 10 interpenetrating a metal sheet 20 of nickel, copper, gold or any other cubic material with centred faces, the step of heating the metal sheet 20 is optional, as well as the surface stripping thereof.

Moreover, according to a preferred embodiment, the aluminium sheet 10 is directly heat treated in accordance with the method according to the invention, without having previously undergone a pre-rolling step. This is because such a pre-rolling could lead to primary or secondary recrystallisations of the aluminium and make its subsequent roll bonding more difficult.

According to a second embodiment, the metal sheet 20 may be a copper sheet 20, more particularly a grid or a lattice. It then suffices, after heat treatment of the aluminium sheet, to roll bond the aluminium sheet and the copper sheet in a single pass cold in the rolling mill with cylinder or cylinders with relief or reliefs, choosing the appropriate reliefs according to the industrial application of the assembly, in order to obtain the metal assembly.

This metal assembly then has numerous properties of interest, typically its excellent conductivity (improved compared with the initial aluminium sheet through the presence of the copper sheet), low density, excellent corrosion resistance, great rigidity in the main direction of the reliefs, etc., which makes it particularly suited to the manufacture of electrodes for fuel cells for example, or any other metal assembly requiring excellent conductivity and corrosion resistance while being lightweight and rigid. It is moreover possible to produce such electrodes in a rolling mill one of the cylinders of which is smooth, only the rolling surface of the corresponding cylinder being provided with reliefs.

The assembly can also comprise a second copper sheet placed on the free face of the aluminium sheet and roll bonded at the same time as the other sheets, in order further to improve the conductivity of the final assembly.

According to a third embodiment, and as indicated previously, the method according to the invention also makes it possible to produce an assembly formed from two sheets of aluminium that penetrate each other. The metal sheet 20 is therefore here the supplementary aluminium sheet.

By virtue of this embodiment, it therefore becomes possible to weld together two aluminium sheets, which could not be envisaged according to the conventional welding techniques, in particular because of the barrier formed by the layer of alumina.

For this purpose, the method of manufacturing a metal assembly 1 of two aluminium sheets comprises simply a supplementary step of heating and cooling the metal sheet (here the supplementary aluminium sheet) with respect to the general method according to the invention.

More precisely, the two aluminium sheets are heat treated, simultaneously or successively, and then cooled, in accordance with the first two steps (heating and then cooling) of the general method previously detailed.

Next the two aluminium sheets are roll bonded, preferably cold and in a single pass, so as to obtain a metal assembly 1 comprising two aluminium sheets that penetrate each other, and having reliefs complementary to the reliefs on the cylinder or cylinders.

This metal assembly 1 has in particular enhanced mechanical characteristics and the same properties as each aluminium sheet taken separately following its respective heat treatment. In particular, it has enhanced corrosion resistance (in particular in 68% nitric acid), can be spot welded, used in a wider range of temperatures, etc.

According to a fourth embodiment, it is possible to weld an additional aluminium sheet 10' to a metal assembly obtained according to the method previously described.

For this purpose, the additional aluminium sheet 10' is heated and then cooled, in accordance with the first two steps of the method, and then the aluminium sheet 10, the metal sheet or sheets 20 and the additional aluminium sheet 10' are directly roll bonded, preferably cold and in a single pass, so as to form the final metal assembly with reliefs comprising at least three layers.

In a variant, the method can also be reiterated by roll bonding the additional aluminium sheet heat treated according to the first two steps of the method with the metal assembly obtained according to the method previously described. In this case, it will then be preferred to roll bond the basic metal assembly 1 (comprising the aluminium sheet 10 and the metal sheet 20) in a rolling mill with smooth cylinders in order to obtain a flat coherent assembly, and to roll bond in the rolling mill with cylinders with the reliefs only the final metal assembly 1.

It is thus possible to obtain for example an assembly comprising a copper sheet 20 or a steel lattice 20 between two sheets of aluminium 10, 10', as illustrated in FIG. 3, obtained by simultaneous roll bonding of the sheets 10, 10' and 20 with the lattice 20 in a single step or by reiterating the steps of the method.

Where the metal assembly 1 is produced with a sheet 20 of steel, iron or any other material mentioned previously, it is necessary, prior to the roll bonding, to raise the metal assembly 1 to a temperature of between 80% and 100% of the melting point of the aluminium sheet in accordance with the first step of the method previously described, for several minutes, for example around thirty minutes.

By reiterating these heating, cooling and roll bonding steps, it is thus possible to obtain sandwiches comprising more than two metal assemblies 1. The number of metal assemblies 1 stacked and the choice of the metal sheet or sheets 20, 20' naturally depend on the properties required for the sandwich 2 and improve the tensile strength (for example the rupture strength is approximately more than three times higher for an aluminium/iron assembly compared with aluminium alone), typically from 50 to 150 MPa.

In a variant, it is also possible to simultaneously roll bond, in a single pass and cold in the rolling mill with cylinders with reliefs, all the sheets constituting the final metal assembly 1. For this purpose, the heat treatment is applied to all the aluminium sheets in accordance with the first steps of the general method previously described, as well as where applicable the heat, surface, etc treatments, to the metal sheets, and then the stack constituting the metal assembly that it is wished to produce is roll bonded cold and in a single pass in the rolling mill with cylinders with reliefs.

According to a fifth embodiment, the metal assembly 1 also comprises a layer of metal powder. Preferably, the metal layer is enclosed between at least two sheets, typically of between two sheets of aluminium, between a sheet of aluminium and a metal sheet (as illustrated in FIG. 5) or two sheets of aluminium and one metal sheet.

In a variant, the layer of powder is roll bonded with a sheet of aluminium in a rolling mill with smooth cylinders and then only in the rolling mill with cylinders with reliefs, so as to obtain a coherent metal assembly comprising only the sheet of aluminium and the metal powder, or where applicable also comprising a metal sheet 20, and having reliefs complementary to the cylinders of the rolling mill.

The method can then also comprise a supplementary step of heat treatment of the metal powder prior to the roll bonding step.

This is because tests have demonstrated that dehydration of the powders improved the cohesion of the metal assembly 1 obtained. The specific surface of the elements constituting the powder is greater than that of the aluminium and metal sheets. Thus the hydration level may become important with regard to the final result obtained, in particular when the assembly 1 is used at temperatures above 100° C., steam creating delamination points by local internal overpressure.

This is because, generally, metal powders may have around 15% water by weight, which may become a problem in particular during ageing treatments, the saturating steam causing delamination of the sheets.

For better results, it is therefore preferable to carry out the heat treatment of the layer 20 of metal powder so that the degree of hydration of the powder is sufficiently low (typically less than 1% surface water and bonded water) in order to reduce the saturating steam at the interfaces during roll bonding with the aluminium sheet 10.

The heating time, preferably under vacuum, depends once again on the density, the thermal capacity, the thermal conductivity and the thickness of the metal sheet 20.

For example, in the case of a layer 20 of iron powder, the heat treatment is thus between approximately thirty minutes and two hours at 300° C., so as to completely dry the powder. Nevertheless, partial drying at 120° C. for around sixty minutes under vacuum may surface for certain types of powder that are not very hydrophilic.

For example, a dehydrated alumina powder generally comprises only 4% surface water and 10% bonded water. In this way, a simple heat pre-treatment sufficiently reduces its degree of hydration in order to obtain good results during roll bonding with the aluminium sheet 10 and limits the risks of delamination.

The layer 20 of metal powder thus obtained is then roll bonded with the thermally treated aluminium sheet 10, preferably cold and in a single pass in a rolling mill with smooth cylinders, or between two sheets in the rolling mill with cylinder or cylinders with reliefs.

This step of roll bonding of the aluminium sheet 10 with the metal powder and where applicable the additional metal sheets is preferably carried out consecutively with the dehydration of the powder, for example during the minutes that follow, in order to prevent moisture being taken up again in the powder. Where applicable, a further heat treatment is possible in order to once again dehydrate the powder.

Once again, the roll bonding is preferably carried out cold and in a single pass.

Moreover, the quantity of powder may be variable, according to the application desired. It is in fact possible to apply a very fine layer of powder, a discontinuous layer of powder, a complete layer, or even several thicknesses of powder. The result obtained then depends on the ratio between the granulometry of the powder 22 and the quantity of powder 22 applied. A very fine layer, having a minimum thickness of around 5 microns, will for example comprise the atomised powder 22 having a ball effect that makes roll bonding difficult. On the other hand, a thick layer, which may be up to two millimeters thick, will for example comprise angular powder 22 that is easy to roll bond.

The metal assembly 1 thus obtained then has unexpected properties, in particular good mechanical characteristics compared with an aluminium sheet alone, and great stability over time.

This is because the metal assembly 1 combines some of the properties particular to aluminium and to the metal constituting the powder taken separately. Thus, in the case of an iron powder, it was found that the metal assembly 1 was ferromagnetic and was capable of attracting magnets and maintaining them in contact with its external surface, while having good electrical conductivity and low density.

The method according to the invention therefore makes it possible to manufacture sandwiches comprising at least one metal assembly and an additional sheet, metal or aluminium.

It may be a case of a stack comprising for example: a metal sheet (in particular a lattice) and metal powder (in particular nickel powder) trapped between two sheets of aluminium, an aluminium sheet trapped between two metal sheets (in particular two copper grilles), etc.

For example, for a metal sandwich 2 comprising two aluminium sheets of AS grade 0.8 millimeters thick (10) and (10') enclosing an XC10 steel lattice 0.8 mm thick (20'), the thickness of the furrow on the sandwich obtained is approximately 0.8 millimeters, a relative magnetic permeability of approximately 100, a density of 3.2 and an electrical conductivity of approximately $4.4 \times 10^{+8}$ ohms$^{-1}$.m$^{-1}$. Moreover, when the patterns are longitudinal furrows (having a width in the assembly plane (in the direction transverse to the roll bonding direction, corresponding to the main direction of the furrows) of around 2 mm for a height of around 1.5 mm):

the longitudinal (that is to say in the principal direction of the furrows) mechanical tensile strength of the sandwich is around three times that of an aluminium sheet with the same thickness and not treated, which is generally between 25 and 80 MPa depending on its metallurgical state, and the bending strength along an axis transverse to the furrows is at least five to ten times greater than that of an aluminium sheet with the same size and not treated, which is around 60 MPa depending on its metallurgical state.

Advantageously, a sandwich 2 comprising two aluminium sheets 10, 10' enclosing a metal sheet 20 has surprising corrosion resistance properties and high resistance to delamination. Thus the immersion of such a sandwich 2 in a bath of liquid nitrogen at 77 K (−196° C.) showed that the sandwich 2 remained coherent despite the different coefficients of expansion of aluminium and steel.

Moreover, the sandwich 2 according to the invention is capable of withstanding a 68% concentrated nitric acid attack for several days. Only the metal sheet 20 is attacked if the edges of the sandwich 2 are not protected, that is to say if the metal sheet 20 enclosed by the aluminium sheets 10, 10' is in contact with the acid.

The impermeability of the metal central part 20 of the sandwich is on the other hand easier to obtain when it comprises powder. It suffices in fact not to put powder on the edges of the aluminium sheets 10, 10' during roll bonding. Then any delamination by oxidation of the metal central part is avoided.

The sandwiches may also be produced with several types of different metal sheets and/or metal powder, in order to combine certain properties of interest. For example, the manufacture of a metal assembly 1 comprising a steel sheet with a metal assembly 1 comprising a nickel sheet makes it possible to obtain a sandwich comprising at the same time aluminium, steel and nickel, in order to adapt the conductivity, magnetic permeability and density for example to the designed application.

Advantageously, the method according to the invention makes it possible to obtain metal assemblies 1 and sandwiches of metal sheets that could easily be recovered by fusion. This is because it is possible to separate and recover by gravity the component of the metal assembly 1 having the lowest melting point. In the case of a mixed sandwich, comprising more than one different material for the metal sheets, it then suffices to repeat the operation until their remains only one type of material.

Moreover, the method has a low energy cost because of the cold roll bonding step and the reduced duration of the heat treatment.

The invention claimed is:

1. Method of manufacturing a metal assembly comprising an aluminium sheet and at least one metal sheet, comprising the following steps:

heat treating the aluminium sheet by raising it to a temperature between 80% and 100% of the melting point of the material constituting it in order to create and stabilize an alpha alumina layer by allotropic transformation of the oxide layer present on the surface of said aluminium sheet, and then cooling said aluminium sheet, the alpha alumina layer having a thickness of 3 μm to 7 μm;

providing the at least one metal sheet having a ductility less than or equal to a ductility of the aluminium sheet after cooling, said at least one metal sheet having surface irregularities with a depth greater than or equal to the thickness of the layer of alpha alumina;

placing the at least one metal sheet onto the aluminium sheet comprising the layer of alpha alumina; and assembling the at least one metal sheet and the aluminium sheet by roll bonding the aluminium sheet comprising the layer of alpha alumina and the at least one metal sheet in a rolling mill so as to form the metal assembly, the roll bonding being carried out cold at a temperature between approximately 0° C. and 60° C., wherein the rolling mill comprises at least one cylinder, the external rolling surface of which is provided with reliefs, and wherein the heat treatment is performed for a duration of approximately forty five minutes or less.

2. Method according to claim 1, wherein the roll bonding is carried out in a single pass.

3. Method according to claim 1, wherein the duration of the heat treatment of the aluminium sheet is between approximately twenty minutes and not longer than forty five minutes.

4. Method according to claim 1, wherein the reliefs are furrows or crosses.

5. Method according to claim 4, wherein the furrows are rectilinear, toothed, crenellated and/or sinuous.

6. Method according to claim 1, wherein the reliefs extend in a direction parallel and/or transverse to the direction of rolling of the sheets in the rolling mill.

7. Method according to claim 1, wherein the rolling mill comprises two complementary cylinders, and wherein the external rolling surface of the two complementary cylinders of the rolling mill have identical reliefs in phase opposition during the roll bonding.

8. Method according to claim 1, wherein the rolling mill comprises two cylinders facing each other, and wherein only one of the two cylinders comprises a surface provided with reliefs, the other cylinder being smooth.

9. Method according to claim 1, wherein the at least one metal sheet is formed by one of the elements in the following group: a metal grille, a metal lattice, a metal foam, a metal honeycomb structure, metal cables, or a rough metal sheet.

10. Method according to claim 1, wherein the at least one metal sheet is produced from one of the materials in the following group: steel, iron, nickel, cobalt, copper, metal with a cubic crystallographic structure with centred faces, or alloys thereof.

11. Method according to claim 10, also comprising the following steps prior to the step of roll bonding of the sheets:

heating the at least one metal sheet to a temperature of between approximately 70% and 98% of the melting point of the metal constituting it for a period determined according to the thickness of the sheet; and cooling the at least one metal sheet to ambient temperature.

12. Method according to claim 11, also comprising a step during which the at least one metal sheet is stripped between the cooling and roll bonding steps.

13. Method according to claim 1, wherein the at least one metal sheet is a supplementary aluminium sheet, said method also comprising, prior to the step of roll bonding of the sheets, the following steps:

raising the supplementary aluminium sheet to a temperature of between 80% and 100% of the melting point of the material constituting it for a sufficient period to create and stabilise a layer of alpha alumina on the surface of said supplementary aluminium sheet; and allowing the supplementary aluminium sheet to cool.

14. Method according to claim 1, also comprising a step during which the at least one metal sheet receives a surface treatment.

15. Method according to claim 1, also comprising a step of assembling the aluminium and metal sheets prior to roll bonding thereof.

16. Method according to claim 15, wherein the step of assembling the sheets is carried out by riveting, spot welding, pre-rolling of a head of the sheets, self-perforating screws, electron beam welding, adhesive bonding and/or flanging.

17. Method according to claim 1, wherein a supplementary metal sheet is also roll bonded with the aluminium sheet and the at least one metal sheet.

18. Method according to claim 17, wherein the at least one metal sheet, the aluminium sheet and the supplementary metal sheet are roll bonded simultaneously in a single step.

19. Method according to claim 17, wherein the aluminium sheet and the at least one metal sheet are first roll bonded in a rolling machine with smooth cylinders in order to obtain a flat assembly, said flat assembly then being roll bonded with the supplementary metal sheet in the rolling mill with a cylinder or cylinders with reliefs in order to obtain the metal assembly.

20. Method according to claim 1, also comprising the step of applying a layer of powder to the aluminium sheet prior to the roll bonding step.

21. Method according to claim 20, wherein the aluminium sheet and the powder are roll bonded in a rolling mill with smooth cylinders in order to obtain a flat assembly, said flat assembly then being roll bonded with the at least one metal sheet in the rolling mill comprising at least one cylinder, the external rolling surface of which is provided with reliefs in order to obtain the metal assembly.

22. Method according to claim 20, wherein the powder is applied to the at least one metal sheet on a side of the at least one metal sheet facing the aluminium sheet prior to the roll bonding step and the metal assembly is formed by roll bonding the aluminium sheet, the powder and the at least one metal sheet in the rolling mill.

23. Method according to claim 20, also comprising a supplementary step of dehydration of the metal powder prior to application thereof to the aluminium sheet.

24. Method of manufacturing a heat exchanger, characterised in that it comprises a step of forming an aluminium sheet with at least one metal sheet according to claim 1 in a rolling mill comprising a first cylinder, the external rolling surface of which has furrows extending longitudinally to the rolling direction, and a second cylinder the external rolling surface of which is smooth or has furrows in phase opposition with the furrows on the first cylinder.

25. Method according to claim 24, wherein the at least one metal sheet is a sheet of copper, iron or steel.

26. Method according to claim 24, wherein the at least one metal sheet is a supplementary aluminium sheet, and the method also comprises, prior to the step of roll bonding of the sheets, the following steps:
raising the supplementary aluminium sheet to a temperature of between 80% and 100% of the melting point of the material constituting it for a sufficient period to create and stabilise a layer of alpha alumina on the surface of said supplementary aluminium sheet; and
allowing the supplementary aluminium sheet to cool.

27. Method according to claim 3, wherein the aluminium sheet is pure aluminium.

* * * * *